2,841,616

PROCESS FOR THE RECOVERY OF ALPHA-KETOGLUTARIC ACID

Carl Berger, Dayton, and Everette E. Witt, Miamisburg, Ohio, assignors to Campbell Soup Company, Camden, N. J., a corporation of New Jersey No Drawing. Application October 30, 1956
Serial No. 619,133

8 Claims. (Cl. 260—537)

This invention relates to an improved process for isolating alpha-ketoglutaric acid from aqueous solutions containing it, and particularly from aqueous fermentation media in which it is produced.

Alpha-ketoglutaric acid may be produced by several methods, including a recent microbiological method described in Lockwood et al. U. S. Patent No. 2,443,919, which method involves fermentation of a strain of bacteria of the Pseudomonas genus in an aqueous nutrient medium. The patent proposes recovering the alpha-ketoglutaric acid after the fermentation has been completed by precipitating it from the filtered aqueous fermentation media as the calcium salt. The patent proposes precipitating the calcium alpha-ketoglutarate by permitting the media containing it to stand for 24 hours, presumably at room or ambient temperatures, or by cooling it to about 10° C. We have discovered that this method does not provide efficient or optimum recovery of the alpha-ketoglutaric acid from the aqueous fermentation media or aqueous solutions.

It is an object of the present invention to provide a process for isolating alpha-ketoglutaric acid from aqueous fermentation media which is not subject to the inefficiencies of prior art methods.

It is another object of the present invention to provide an improved process of isolating alpha-ketoglutaric acid from its aqueous solutions, which process permits highly efficient recovery of the substance and provides an effective process for purifying it.

Other objects and advantages will be apparent to those skilled in the art from the description which follows.

In accordance with the present invention we have discovered that improved recoveries of alpha-ketoglutaric acid from its aqueous solutions, which may optionally contain other unwanted dissolved substances, may be obtained if an alkaline-earth metal compound is added to the solution and the temperature of the mixture elevated to a temperature of 90° C. or above. The process of the invention takes advantage of the fact that the alkaline-earth metal salts of alpha-ketoglutaric acid, which are formed in the course of the process, are inversely soluble in water with increased temperature. The alkaline-earth metal salts of alpha-ketoglutaric acid which precipitate are filtered from the solution while the latter is maintained at a temperature of 90° C. or above. For optimum results, it is preferred that the temperature be maintained at substantially the boiling point of the solution both during the precipitation of the salt and its removal from the solution by means such as filtration or centrifugation. Since these salts of alpha-ketoglutaric acid are significantly less soluble in water at the elevated temperatures, higher recoveries of alpha-ketoglutaric acid from the aqueous solution are possible than when lower temperatures, including ambient temperatures, are employed.

We have further discovered that the recovery of alpha-ketoglutaric acid is enhanced if during the precipitation and the removal of the precipitate of the alkaline-earth metal salt of alpha-ketoglutaric acid, the pH of the solution is adjusted to and maintained within a preferred pH range of between about 6.0 and 6.5. At pH values substantially below about 6.0, the alpha-ketoglutaric acid tends to dissociate from its alkaline-earth metal salt. At pH values substantially above about 6.5, alkaline-earth metal carbonates or phosphates, if phosphate ions are present in substantial amounts, tend to precipitate from the solution and contaminate the alkaline-earth metal alpha-ketoglutarate.

The alkaline-earth metal compound employed to precipitate the alpha-ketoglutaric acid may be any alkaline-earth metal salt or hydroxide which is soluble in water in the concentration employed. The alkaline-earth metals which may be employed include calcium, barium, strontium and magnesium. Calcium is preferred because it is generally less toxic than barium and strontium. The calcium compounds which may be employed include the following: the chloride, bromide, nitrate, acetate, nitrite, benzoate, citrate, formate, lactate, proprionate, iodide, and, if the aqueous solution is acid, the carbonate and hydroxide. Suitable barium, strontium and magnesium compounds include the acetates, butyrates, propionates, bromides, chlorides, iodides, nitrates, nitrites, and, if the aqueous solution is acid, the carbonates and hydroxides. Compounds of the alkaline-earth metals which are ordinarily not very soluble in water, but which are soluble in acid solutions, may be employed provided the pH of the solution is adjusted to the acid range. Thus calcium carbonate, which is ordinarily not soluble in water, may be employed as the source of calcium ions, provided the pH of the solution is adjusted to a value of about 1.5 to 2.0, if necessary, by adding a mineral acid, such as hydrochloric acid, to the solution. As those skilled in the art will appreciate, this embodiment constitutes in essence the formation in situ of a salt of calcium and a strong acid, such as calcium chloride. When this latter embodiment is employed, it is desirable to adjust and maintain the pH value with the range of about 6.0 and 6.5 as promptly as possible after dissolving the source of metal ions.

For best results, the alkaline-earth metal salt employed to precipitate the alpha-ketoglutaric acid should be of an alkaline-earth metal which forms a salt of the alpha-ketoglutaric which is soluble to an extent of not greater than 0.2 gram per 100 ml. of solution at 90° C.

The alkaline-earth metals are bivalent and alpha-ketoglutaric acid is a dicarboxylic acid. Consequently, the salts formed are the mono-alkaline-earth metal salts produced from a 1 to 1 molecular ratio of alkaline-earth metal compound and alpha-ketoglutaric acid. For maximum precipitation of the alpha-ketoglutaric acid, it is preferred to add the alkaline-earth metal compound in slight excess of equimolar proportions.

The alpha-ketglutaric acid may be recovered from the precipitate of the alkaline-earth metal salt by dissolving it in water with the addition of enough hydrochloric acid to adjust the pH value to about 1.5 to 2.0. The resulting solution is extracted with several quantities of an organic solvent, such as ethyl acetate. After evaporating the solvent from the combined extract fractions, a highly pure grade of alpha-ketoglutaric acid having a melting point of about 115–117° C. may be obtained.

As those skilled in the art will recognize, if the concentration of the alkaline-earth metal alpha-ketoglutarate is sufficiently great, it may precipitate from the solution at room temperature. However, significantly enhanced amounts of precipitate and more efficient recoveries of the salt may be obtained if the temperature is elevated to a temperature of above about 90° C.

In order to disclose more clearly the nature of the present invention, several examples will hereinafter be described. This is done neither to delineate the scope of the invention nor to limit the ambit of the appended claims.

Example 1

About 1 gram of alpha-ketoglutaric acid was dissolved in 25 ml. of water. To this solution was added 1 gram of calcium carbonate. Sufficient concentrated hydrochloric acid was then added to the mixture to adjust the pH to a range of about 1.5 to 2.0. The calcium carbonate then dissolved. The resulting solution was filtered and the pH adjusted to within a range of about 6.0 to 6.5, by adding a sufficient amount of a concentrated aqueous solution of sodium hydroxide. The solution was then placed on a hot plate and permitted to boil for about 10 minutes during which time the water which evaporated was replaced. At the end of this time, and while the solution was at substantially the boiling point, the crystalline precipitate of calcium alpha-ketoglutarate was filtered from the solution through No. 1 Whatman filter paper and the precipitate air dried for 24 hours at room temperature. The weight of the dried, white, powdery calcium alpha-ketoglutarate was 1.6 grams.

Example 2

An active strain of *Pseudomonas fluorescens* was fermented for about 8 days at a temperature of 27° C. in a fermentation medium of the following composition:

| Ingredient: | Grams/100 ml. |
| --- | --- |
| Glucose, pure | 9.0 |
| Ammonium sulfate, pure | 0.32 |
| Potassium dihydrogenphosphate, pure | 0.11 |
| Magnesium sulfate heptahydrate, C. P. | 0.49 |
| Iron (as ferrous ammonium sulfate heptahydrate, C. P.) | 0.0007 |
| Calcium carbonate, pure | 3.75 |

At the end of the fermentation, the medium contained a significant amount of alpha-ketoglutaric acid. A 100-ml. sample of the fermentation liquor was treated with sufficient concentrated hydrochloric acid to adjust the pH to between about 1.5 to 2.0. The resulting solution was then filtered through a No. 4 Ertel filter pad. Sufficient concentrated aqueous solution of sodium hydroxide was added to the clear, yellow-brown filtrate to adjust the pH to between about 6.0 and 6.5. The filtrate was then boiled for about 10 minutes with the replacement of the water which evaporated. The boiling solution was filtered and the precipitate, which was calcium alpha-ketoglutarate, recovered and dried at about 110° C. for one hour. The calcium ions necessary for the formation of calcium alpha-ketoglutarate were those added to the initial fermentation medium as calcium carbonate. The weight of the dried calcium salt was 3.7 grams, which is equal to about 2 grams of alpha-ketoglutaric acid per 100 ml. of fermentation liquor.

The free alpha-ketoglutaric acid was recovered from the calcium salt by dissolving it in water with the addition of enough hydrochloric acid to adjust the pH value to about 1.5 to 2.0. The resulting solution was extracted with several quantities of ethyl acetate. The ethyl acetate was evaporated from the solution and the residue of alpha-ketoglutaric acid, after being air dried for 24 hours at room temperature, was found to have a melting point of about 115–117° C.

As will be recognized by those skilled in the art after reading the description hereinabove, other sources of alkaline-earth metal ions may be employed in the foregoing examples. Thus in place of the calcium carbonate used in the acid solutions of these examples, there may be employed the chlorides, bromides, nitrates, nitrites, iodides, acetates, butyrates, propionates, etc., of calcium, barium and strontium.

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. In the process of isolating alpha-ketoglutaric acid from its aqueous solutions in the form of its alkaline-earth metal salts, the novel steps which comprise heating the solution containing the salt to a temperature of at least about 90° C. and removing the precipitate of alkaline-earth metal alpha-ketoglutarate which forms from the solution.

2. The process as defined by claim 1 wherein the temperature is maintained at between about 90° C. and the boiling point of the solution while the precipitate of alkaline-earth metal alpha-ketoglutarate which forms is removed from the solution.

3. The process as defined by claim 1 wherein the temperature is maintained at substantially its boiling point.

4. The process as defined by claim 1 wherein the pH of the solution is adjusted to between about 6.0 and 6.5 prior to removing the precipitate of alkaline-earth metal alpha-ketoglutarate from the solution.

5. The process for isolating alpha-ketoglutaric acid from its aqueous solution, which comprises adding a water-soluble alkaline-earth metal compound to the solution, heating the resulting mixture to a temperature of at least about 90° C., and removing the precipitate of alkaline-earth metal alpha-ketoglutarate from the mixture.

6. The process as defined by claim 5 where the pH of the mixture is maintained at about 6.0 to 6.5 while removing the precipitate of alkaline-earth metal alpha-ketoglutarate from the mixture.

7. The process as defined by claim 1 wherein the alkaline-earth metal salt of the alpha-ketoglutaric acid is the calcium salt.

8. The process as defined by claim 5 wherein the alkaline-earth metal is calcium.

References Cited in the file of this patent

UNITED STATES PATENTS

| 2,443,919 | Lockwood et al. | June 22, 1948 |
| 2,724,680 | Koepsell et al. | Nov. 22, 1955 |